J. F. NORMAN.
BRAKE SHOE.
APPLICATION FILED APR. 30, 1908.
909,015.
Patented Jan. 5, 1909.
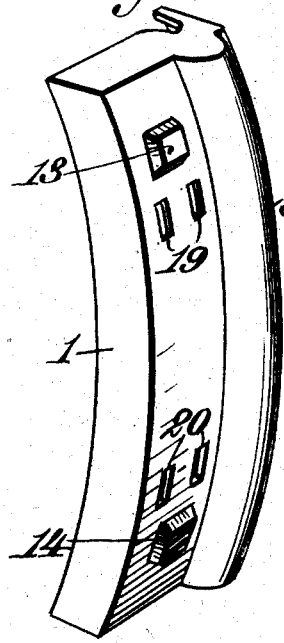
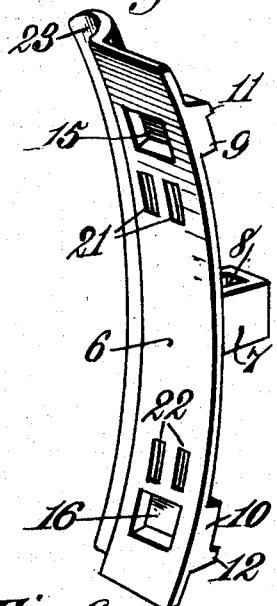
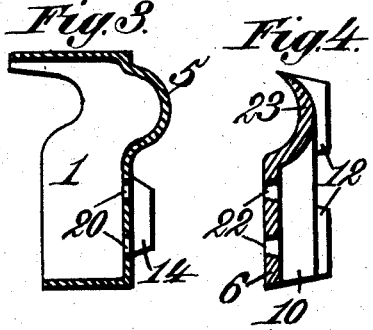
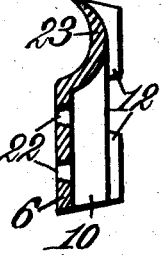
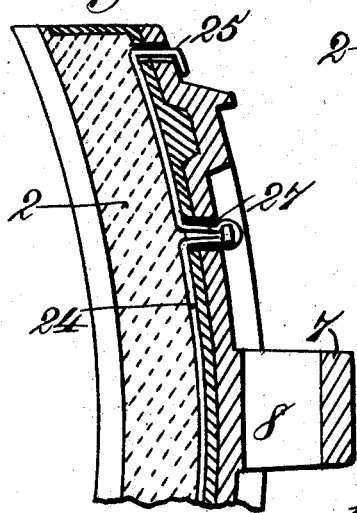
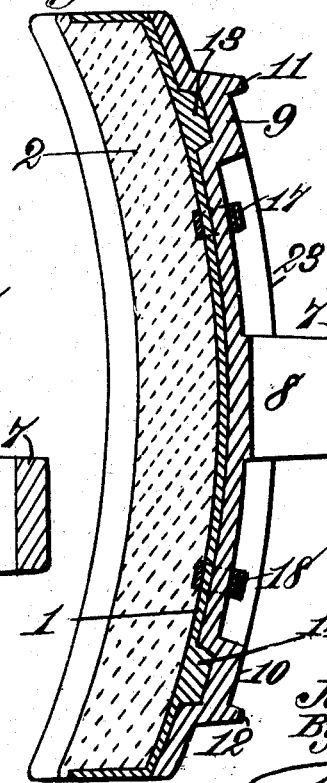
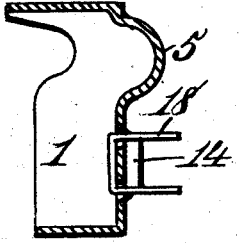
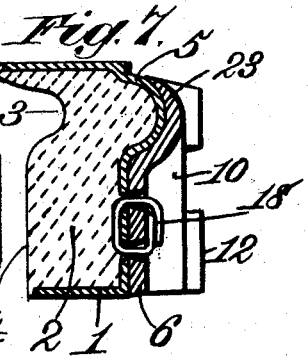
Witnesses.
Inventor:
John F. Norman,
By James L. Norris
Atty.

UNITED STATES PATENT OFFICE.

JOHN F. NORMAN, OF LIMA, OHIO, ASSIGNOR TO THE LIMA BRAKE SHOE CO., OF LIMA, OHIO, A CORPORATION OF OHIO.

BRAKE-SHOE.

No. 909,015.      Specification of Letters Patent.      Patented Jan. 5, 1909.

Application filed April 30, 1908. Serial No. 430,219.

*To all whom it may concern:*

Be it known that I, JOHN F. NORMAN, a citizen of the United States, residing at Lima, in the county of Allen and State of Ohio, have invented new and useful Improvements in Brake-Shoes, of which the following is a specification.

My present invention relates to improvements in brake shoes and more especially to that class of shoes provided with friction faces of composition material, and it has for its object primarily to provide an improved shoe of this character wherein the composition material is contained in a shell which is detachably secured to a back, the latter being adapted for attachment to the usual brake head, whereby the shell may be readily removed after the friction material therein has been worn and a new one may be readily substituted, projections being formed on one of the parts, preferably the shell, and adapted to interlock with corresponding recesses in the other part, whereby the shell is properly positioned with respect to the back and the thrust between the shell and back due to the friction of the shoe against the wheel is effectually sustained.

Another object of the invention is to provide simple and cheap devices which may be readily made to effectually lock the shell detachably to the back and which may be readily unfastened to permit removal of the shell, preparatory to the substitution of a new one.

A further object of the invention is to provide a shell of this character having a grooved portion to accommodate the wheel flange in order that the maximum braking action thereon may be obtained, the back of the shell being provided with a corresponding depression which will accommodate the wheel flange when the friction facing has been worn thin, thus prolonging the life of the shoe, the depression in the back of the shell forming a rib which is accommodated by a corresponding groove formed at one edge of the back, said rib coöperating with the groove on the back to prevent relative lateral displacement of the parts while the shell and back are in locked engagement.

To these and other ends, the invention consists in certain improvements, and combinations and arrangements of parts, all as will be hereinafter more fully described, the novel features being pointed out particularly in the claims at the end of the specification.

In the accompanying drawing: Figures 1 and 2 are perspective views of the shell and back detached from one another; Figs. 3 and 4 represent transverse sections through the shell and back, the parts being detached; Fig. 5 represents a transverse section through the shell filled with the friction material, the attaching staple being shown in readiness to enter the back; Figs. 6 and 7 represent respectively longitudinal and transverse sections showing the shell and back in locked engagement; and Fig. 8 is a detail view of another form of locking means which may be employed for detachably securing the shell to the back.

Similar parts are designated by the same reference characters in the several views.

Brake shoes constructed in accordance with my present invention are adapted for use generally in connection with railways of various kinds, and it is preferable to use a shoe having a filling or friction facing composed of a non-metallic composition which possesses a relatively high co-efficient of friction, although it does not metarially wear the tires of the wheels.

In the accompanying drawing, I have shown one embodiment of the invention which comprises a shell 1 which is preferably formed of an integral casting of any suitable metal, cast iron being appropriate. This shell is preferably curved to conform substantially to the curvature of the car wheel in connection with which it is to be used, and it is made hollow to receive a filling of friction material, the shell having side and end walls and a rear wall, the front of the shell being open in order that the friction material 2 may be exposed to the tire of the wheel. In order to obtain the maximum braking action upon the wheel, this friction material is wider than the tire and is provided with a curved vertical groove 3 which conforms to the shape of the flange on the wheel and is adapted to have a frictional engagement therewith, the flat face 4 of the friction material engaging the flat portion of the tire as usual.

In order to prolong the life of the shoe and enable the shoe to be used until practically all of the composition filling has been used, the rear wall of the shell is provided with a vertical rib 5 which projects rearwardly from the shell and is hollow at its forward side and immediately in rear or in alinement with the flange-receiving groove 3 in the composition filling, a portion of the filling entering this groove at the rear of the shell so that the composition filling will possess substantially the same thickness at the grooved and flat portions. In other words, the outline of the rear wall of the shell conforms substantially to the outline of the forward face of the composition filling, and as the tire of the wheel wears away the friction material, the flange of the wheel will be accommodated in the forward or grooved side of the rib 5 so that the composition material may be worn very thin before it is necessary to discard the shell.

The shell containing the composition material may be supported upon the brake beam in any appropriate manner, but as it is usual to employ a brake head of a standard construction, I have shown in the present instance, a backing which is provided with means for detachably locking it to the shell and for adapting the shell for attachment to the usual brake head. This backing in the present instance is composed of a casting or other appropriate part 6 which conforms in shape to the curvature of the rear wall of the shell, the coöperating walls of these two parts being preferably smooth in order to provide a firm bearing whereby the back may transmit the braking pressure to the shell. The back is provided with an attaching lug 7 which enters the usual socket in the brake head and is provided with a key-receiving aperture 8 by means of which the back may be locked to the brake head. Adjacent to the opposite ends of the back and at the rear thereof are formed a pair of bosses 9 and 10 upon which the ends of the brake head rest and thereby transmit the braking pressure to the shoe, reversely arranged flanges 11 and 12 being formed at the respective upper and lower edges of the bosses to sustain the thrust between the shoe and head.

In order to properly position the shell upon the back and to effectually sustain the thrust between these parts due to the friction of the shoe against the wheel, one of the parts, the shell in the present instance, is provided with a pair of upper and lower centering and locking projections 13 and 14 which project rearwardly from the rear wall of the shell and are adapted to enter correspondingly arranged recesses 15 and 16 formed in the forward face of the back. In order to insure a close fit between these locking projections and their coöperating recesses, the walls of the projections are preferably tapered toward their outer ends, and the walls of the coöperating recesses are also correspondingly tapered. When the locking projections enter the corresponding recesses, these tapered walls of the projections and recesses will coöperate to form a close fit that will effectually prevent looseness between the shell and backing which would result in rattling or other objectionable vibration.

The shell and back are fastened in locking engagement in the present instance by means of a pair of upper and lower staples 17 and 18, these staples being yoke-shaped when applied, and they are preferebly inserted into the shell from the forward side thereof before the application of the friction material thereto, the ends of the staples extending rearwardly through pairs of apertures 19 and 20 formed in the rear wall of the shell. After the staples have been thus introduced, the friction material may be applied to the shell, and this material bearing against the staples will retain them in proper position. The back is provided with similar pairs of apertures 21 and 22 through which the ends of the staples pass when the shell is properly applied to the back. While the shell is firmly pressed in locking engagement with the back, the ends of the staples which protrude at the rear of the back are bent so as to clench them, these ends being preferably bent toward one another so as to overlap, as shown in Fig. 7. For this purpose, the staples are composed of bendable metal of suitable strength, the ends being bent by means of a hammer or other appropriate tool, and when it is necessary to replace a worn shoe, these ends may be again straightened by means of an appropriate implement, or they may be broken off entirely as it is not necessary to again use them, and in this way, corrosion of the parts will not render difficult the operation of replacing the shoes.

In order to assist the securing devices and the locking projections in supporting the shoe upon the back and to also assist in transmitting the braking pressure from the brake beam to the shell, a curved flange 23 is formed to extend longitudinally of the inner edge of the back, this flange conforming to the shape of the rib 5 of the shell so as to form a close fit therewith. By reason of the transverse curvature of the rib 5 and the coöperating flange, these parts will coöperate to prevent relative lateral displacement of the shell and the back, and the flange increases the width of the back so as to distribute the pressure transmitted from the brake beam to the shell. By providing the back with such a flange, the back may be made comparatively thin so as not to increase the thickness of the shoe beyond the standard dimensions, the back still possessing the requisite strength so that it will not lose its shape nor become broken.

Instead of using a pair of staples to detachably fasten the shell to the back, a single fastening strip such as that shown in Fig. 8 may be used, this strip 24 extending lengthwise within the back of the shell and having at each end a rearwardly extending portion 25 arranged to pass through an opening at the end of the shell and adapted to be clenched against the rear of the back member, a loop 27 being formed intermediately of each end and the middle of the strip and is adapted to pass through a corresponding opening in the rear of the shell and the back member, these loops being adapted to receive cotter pins or other suitable devices which may removably lock the strip.

Brake shoes constructed in accordance with my present invention are capable of being used until the friction material has been practically exhausted, and a worn shoe may be quickly and inexpensively replaced with a new one because of the cheaply constructed securing devices which lock the shell containing the friction material to the back. Moreover, by providing a back which adapts the shell for attachment to the usual standard brake head, the improved shoe may be interchangeably used on brake rigging of all kinds without requiring any modification of such rigging. The improved devices for positioning and interlocking the shell with the back insure a close fit and firm locking engagement between the shell and back, so that looseness or vibration is eliminated, and by using a back provided with a flange constructed to accommodate the rib on the shell, the shoe may be used until completely worn out and the rib and flange coöperate to assist in the locking engagement between the shell and back.

I claim as my invention:—

1. A brake shoe comprising a part adapted to support a suitable friction material, a back provided with means for attaching it to a brake head, and means for detachably fastening said parts comprising a bendable tongue attached to one part and adapted to be bent into locking engagement with the other part.

2. A brake shoe comprising a shell adapted to contain a filling of friction material, a back provided with means for attaching it to a brake head, and means for detachably securing said shell to the back comprising tongues attached to the shell and adapted to be bent into locking engagement with the rear of said back.

3. A brake shoe comprising a shell adapted to contain a suitable friction material, a back adapted for attachment to a brake head, and staples attached to the shell and having bendable portions accessible from the rear of said back for detachably fastening the shell thereto.

4. A brake shoe comprising a shell adapted to contain a composition filling and provided with pairs of upper and lower apertures in its rear wall, a back having corresponding pairs of apertures, and staples having intermediate portions engaging the shell and adapted to be engaged by the filling, the ends of the staples extending through the apertures in the shell and back and adapted to be bent against the rear of the back to detachably fasten the shell thereto.

5. A brake shoe comprising a shell having pairs of upper and lower apertures in its rear wall, a composition filling contained in the shell, a thin back provided with means for attaching it to a brake head and provided with pairs of upper and lower apertures, and a pair of staples having intermediate portions engaging the shell and held in position by the composition filling, the bendable ends of the staples extending through the apertures of the shell and back and bent against the rear of the back in overlapping relation.

6. A brake shoe comprising a back provided with means for attaching it to a brake head, a shell adapted to contain a suitable friction material, fastening devices for securing the shell to said back, and interlocking devices interposed between the shell and back for positioning said parts and sustaining the thrust due to the friction of the shoe upon a car wheel, the interlocking devices being drawn into locking engagement by said fastening devices.

7. A brake shoe comprising a shell adapted to contain a friction material, a back, and means for securing said shell to said back, one of said parts having locking recesses in one face and the coöperating part having correspondingly arranged projections to interlock with said recesses for positioning the shell relatively to the back and for sustaining relative thrust, said projections being drawn into locking engagement with said recesses by the said securing means.

8. A brake shoe comprising a shell adapted to contain a friction material, a back for supporting the shell, and means for securing the shell to the back, one part being provided with locking recesses having tapered walls, and the other part being provided with correspondingly arranged projections adapted to interlock with said recesses and having correspondingly tapered walls to coöperate with the walls of said recesses to position the shell relatively to the back and to sustain relative thrust between said parts, the securing means serving to draw the said projections into the respective recesses.

9. A brake shoe comprising a back provided with upper and lower bosses to receive the pressure from the brake head and provided on their forward sides with locking recesses, a shell adapted to contain a friction material and having upper and lower projections formed on its rear wall to interlock with said recesses formed in the back, and means for fastening the shell to said back.

10. A brake shoe comprising a shell having a longitudinal rib formed in its rear wall and providing a groove at its forward side, a composition filling contained in said shell and having a longitudinal groove in alinement with the groove of the shell to receive a wheel flange, and a back adapted to fit the rear of said shell and having means to accommodate the rib formed thereon.

11. A brake shoe comprising a shell having a longitudinal rib formed in its rear wall and providing a groove at the forward side thereof, a composition filling contained in said shell and having a longitudinal groove in alinement with the groove of the shell and adapted to receive a wheel flange, a back adapted to fit the rear wall of the shell and provided with a grooved flange at its inner vertical edge to fit and receive said rib on the shell, and means for detachably fastening the shell to said back.

12. A brake shoe comprising a shell having a longitudinal rib formed in its rear wall and providing a groove at the forward side thereof, a composition filling contained in said shell and having a longitudinal groove in alinement with the groove of the shell to receive a car wheel flange, a back provided with means for attaching it to a brake head, said back having a portion to fit the rear wall of the shell and provided with a transversely curved flange formed at one edge thereof to fit and receive the rib on the rear of the shell, fastening devices arranged at one side of said flange on the back for detachably securing the back to the shell, and interlocking devices for positioning the shell relatively to the back and for sustaining a relative longitudinal thrust.

13. A brake shoe comprising a shell adapted to contain a filling of friction material, a supporting back member adapted to receive the shell, and a strip of bendable material extending through portions of the shell and back member and adapted to be bent into locking engagement with one of the parts.

14. A brake shoe comprising a shell adapted to contain a filling of friction material, a back member adapted to receive and support the shell, and means for detachably securing the shell to the back member comprising a strip of bendable metal arranged in the rear portion of the shell and retained in such position by the filling material, portions of said strip being adapted to extend through the back of the shell and to be clenched in securing relation to the back supporting member.

In testimony whereof I have hereunto set my hand in presence of two subscribing witnesses.

JOHN F. NORMAN.

Witnesses:
   ELMER E. HAY,
   J. WARREN KILGORE.